US006801879B2

(12) United States Patent
Chretinat

(10) Patent No.: US 6,801,879 B2
(45) Date of Patent: Oct. 5, 2004

(54) METHOD AND APPARATUS FOR MONITORING PROCESSES IN A WEB-PROCESSING PRINTING MACHINE

(75) Inventor: Michel Chretinat, Agnetz (FR)

(73) Assignee: Heidelberger Druckmaschinen AG, Heidelberg (DE)

( * ) Notice: Subject to any disclaimer, the term of this patent is extended or adjusted under 35 U.S.C. 154(b) by 201 days.

(21) Appl. No.: 10/106,147

(22) Filed: Mar. 26, 2002

(65) Prior Publication Data

US 2002/0138233 A1 Sep. 26, 2002

(30) Foreign Application Priority Data

Mar. 26, 2001 (DE) ........................................ 101 14 853

(51) Int. Cl.[7] ................................................ G06F 15/18
(52) U.S. Cl. ............................ 702/189; 706/3; 700/128
(58) Field of Search ......................... 706/2, 3; 700/129, 700/128; 702/188, 43, 85, 189, 194

(56) References Cited

U.S. PATENT DOCUMENTS 5,231,452 A * 7/1993 Murayama et al. ........... 399/42
5,430,642 A * 7/1995 Nakajima et al. ............. 700/50
5,516,041 A * 5/1996 Davis et al. ............... 236/49.3
6,211,968 B1 * 4/2001 Glockner et al. ............ 358/1.4
6,490,572 B2 * 12/2002 Akkiraju et al. .............. 706/19

FOREIGN PATENT DOCUMENTS

DE 41 22 794 A1 1/1993
EP 0 829 809 A1 3/1998
EP 0 829 809 B1 3/1998
EP 0 891 863 B1 1/1999
JP 09 052 354 A 2/1997

OTHER PUBLICATIONS

R.E. Joslin; "The Vortex Ring State Fallacy"; Approach, Jun. 2003.*

Ulrich Schmitt: "Expertensysteme" [expert systems], Druckwelt, No. 5, Mar. 10, 1993, pp. 28–31.

* cited by examiner

*Primary Examiner*—Marc S. Hoff
*Assistant Examiner*—Paul L Kim
(74) *Attorney, Agent, or Firm*—Laurence A. Greenberg; Werner H. Stemer; Ralph E. Locher

(57) ABSTRACT

A method for monitoring processes includes identifying process variables in a process space as operating values, carrying out a measurement of actual values of the operating values, presetting or measuring actual values of at least one operating parameter that influences these operating values, assessing operating values as a function of the operating parameters, and generating a map of the process space by allocating at least one subset of points of the process space to at least two classes which represent a measure of the risk of the operating state of the printing machine. An apparatus for implementing the above-described method has at least one diagnostic apparatus, an input unit, a machine control unit and a display apparatus. The apparatus also has a cartography unit which provides a map of the process space of the operating values as a function of the operating parameters.

15 Claims, 4 Drawing Sheets

METHOD AND APPARATUS FOR MONITORING PROCESSES IN A WEB-PROCESSING PRINTING MACHINE

BACKGROUND OF THE INVENTION

FIELD OF THE INVENTION

The invention relates to a method of monitoring processes, in particular the printing process, in a web-processing printing machine. The invention relates in particular to a method according to which process variables are identified in a process space as operating values, which include at least the web tension and the web speed, a measurement of actual values of the operating values is carried out, a presetting or a measurement of actual values of at least one operating parameter that influences these operating values is performed and operating values are assessed as a function of the operating parameters.

It is generally known to measure individual process variables in a printing machine and also to evaluate them as a function of the process state. In the set of individual process variables for the case of a web-processing printing machine, particular significance is attached to the operating values of web tension and web speed. One source of risk for the nonproductivity of a printing machine for a printing material web is, in particular, a web break, which can frequently be attributed to an inappropriate web tension and/or web speed. The risk of the occurrence of such a situation is often only poorly known or can only be poorly estimated. Known monitoring devices for printing machines from time to time permit subsequent analysis of a problem situation but not its avoidance through the use of a prewarning or prediction of inappropriate operating values in the process space of the process variables.

An appropriate and user-friendly visualization of process states of a technical plant is often difficult, because of a multidimensional interdependence and is associated with a large computational outlay. For example, in Published European Patent Application No. EP 0 829 809 A1, a method for the multidimensional display of process states of a technical plant is disclosed, being suitable in particular for the display of process states in a power station plant. In order to permit simultaneous and coherent assessment and display of relevant process variables of the plant, it is proposed to evaluate the relevant process variables in a relationship with one another through the use of a neural analysis on the basis of self-organizing maps by a topology-maintaining, nonlinear projection of data of the relevant process variables onto a multidimensional neural map being implemented. Through the use of dynamic visualization of win rates of individual neurons, a projection of the physical plant states onto a developed map is carried out, so that through the use of a neural "winner takes all" algorithm, the current winner neuron is determined and the summed winner rates of the individual neurons on the map can be displayed in encoded form. Through the use of the method described, each plant state which is determined by a plurality of independent process variables can be represented through the use of a projection onto only two or three dimensions, so that improved clarity relating to the actual process states is achieved. Therefore, according to the invention, a projection is carried out onto nonlinear surfaces, so-called main manifolds, which are covered by the topology-maintaining maps in the state space.

The disadvantage when applying such a method to the display of process states of a printing machine for a printing material web is, in particular, the high computational outlay. Furthermore, the process space can be broken down into operating values, to which an actual value and a desired value can be assigned, and operating parameters that influence these operating values. In other words: in the case of the process space of a printing machine for a printing material web, there are low-dimensional, typically two- or three-dimensional hypersurfaces or hyperplanes in the process space whose position is determined by a specific combination of operating parameters. This fact simplifies the procedures in the process space considerably.

SUMMARY OF THE INVENTION

It is accordingly an object of the invention to provide a method of monitoring processes, in particular a printing process, of a web-processing printing machine and an associated apparatus for implementing the method, which overcome the above-mentioned disadvantages of the heretofore-known methods and devices of this general type and which allow the machine operator to make a simple analysis of the actual values of specific operating values and helps avoid operating the machine in a region of critical operating values and operating parameters.

With the foregoing and other objects in view there is provided, in accordance with the invention, a method for monitoring processes of a web-processing printing machine, the method includes the steps of:

identifying process variables in a process space as operating values including at least a web tension and a web speed;

carrying out a measurement of actual values of the operating values;

presetting and/or measuring actual values of at least one operating parameter that influences the operating values;

assessing the operating values in dependence on the at least one operating parameter; and generating a map of the process space by allocating at least a subset of points of the process space to at least two classes representing a measure of a risk of an operating state of the web-processing printing machine.

In other words, the method according to the invention of monitoring processes, in particular the printing process, in a web-processing printing machine, process variables being identified in a process space as operating values, which include at least the web tension and the web speed, a measurement of actual values of the operating values being carried out, a predefinition or a measurement of actual values of at least one operating parameter that influences these operating values being performed and operating values being assessed as a function of the operating parameters, is distinguished by the fact that a map of the process space is generated, an allocation of at least one subset of points of the process space to at least two classes being performed, which represents a measure of the risk of the operating state of the printing machine. In other words, it is distinguished by the fact that there is a map of at least one subset of the process space, typically of the subspace of the operating values or a process space of the operating values as a function of the operating parameters, which subjects the possible operating values to a classification with at least two classes. The process space is formed by the value set of all process variables, a subset of the process variables being referred to or identified as operating values if their special significance for the process has been detected or realized. For example, these are process variables which have to be varied actively or monitored by the machine operator during operation, such as typically the web speed and the web tension. An assessment of operating values can be carried out through the use of simple functional relationship using numerical values from a value set. The group of operating parameters in this case includes printing material characteristics, the time since the last web cut, the time since the last rubber blanket cleaning, parameters of the dryer, the rate of printing material defects on the running reel and the like.

In other words, the process space is the set of all possible operating states which are characterized by process variables, so-called operating values and operating parameters, that is to say the set of all possible combinations of operating values and operating parameters. In other words: the process space is covered by the operating values and the operating parameters. Here, the operating values form a process subspace. A hyperplane or hypersurface in the process space, which is covered i.e. defined by at least two process variables from the set of operating values with the operating parameters fixed, is therefore typically an affine subspace of the entire process space and is also designated a process space of the operating values as a function of the operating parameters.

A map in the process space is therefore understood to mean a projection of at least a subset of the points in the process space into the set of real numbers. The subset of points in the process space will preferably be the process subspace or a process space of the operating values as a function of the operating parameters and the value set will include only a small subset of the real numbers, which has at least two elements. The projection has the meaning of classifying a numerical value for the risk assessment relating to a point in the process space, and will therefore also be designated the risk classification.

The method according to the invention for process monitoring of a printing machine with a map of at least a subset of the process space makes it possible in a simple manner for the machine operator to be given a measure of the risk level, that is to say in particular the probability or for an interval of probabilities of a web break. Therefore, not only is the information about the current actual values of the operating values in the process space supplied, but at the same time information about the environment of these operating values in the process space is made available. Taking this knowledge into account for the monitoring, control and/or regulation of the printing machine can lead to a reduction in the risk of a failure or of the occurrence of nonproductive time.

Provision is made for the accuracy of the map of the process space to be increased through the information obtained through the use of ongoing measurements and their further processing. With an increasing number of measurements, be it on all machines in a series or only on a specific available machine the intention is therefore for the knowledge of the map to be refined. The results of the measurements on other machines in a series can, for example, be used for a specific machine in this series, by corresponding data being imparted to the machine control unit, be it at the time of delivery or be it through the use of transmission. In general, functional values at points in the process space are obtained through the use of test runs and, to an increasing extent, through the use of production runs. Typically, initially statistically distributed points will be concerned, and then areas in the process space will be considered, in which the functional values change considerably.

For the purpose of creating the map or its refinement, interpolations of the functional values of the assessment or classification between measured points in the process space can advantageously be performed. Alternatively or additionally, the increase in the accuracy or the refinement of the knowledge of the map can also be carried out by calculating functional values or classifications by using fuzzy logic with suitable fuzzy sets and fuzzy rules. In an advantageous development of the invention a neural network is used for the further processing of the information obtained through the use of ongoing measurements.

Furthermore, the method according to the invention for process monitoring of a printing machine for a printing material web can advantageously include a predefinition of desired values for the operating values which include at least the web tension and the web speed.

In order to avoid operating the web-processing printing machine with operating values and/or operating parameters which are affected by risk, the change from an actual value to a desired value of the operating values is carried out along a suitable route in the process space, which avoids points in the process space in a specific class whose membership represents a measure of the risk.

An apparatus according to the invention for implementing such a method for process monitoring of a printing machine for a printing material web includes at least one diagnostic apparatus, an input unit, a machine control unit and is distinguished by the fact that a cartography unit provides a map of the process space of the operating values as a function of the operating parameters. For the machine operator, a display apparatus is provided, so that a simple and convenient visualization of the hypersurface in the process space covered by the operating values can be carried out. In an advantageous development of the invention, a navigation unit is provided in order to determine a route in the process space, the navigation unit calculating or carrying out a change of at least one operating value from an actual value to a desired value while avoiding points in the process space.

Such a method according to the invention and such an apparatus according to the invention can particularly advantageously be implemented in a printing machine, in particular a web-fed rotary printing machine or offset printing machine, for a printing material web. In addition to the avoidance of certain risks through the use of specific operating values and operating parameters in the process space, the knowledge of the process space can also be used to optimize quality parameters. Optimal operation with minimized risk can be carried out in advance, at least in a local region of the process space.

With the objects of the invention in view there is also provided, an apparatus for monitoring processes in a web-processing printing machine, including:

an input unit;

a machine control unit connected to the input unit;

a cartography unit connected to the machine control unit;

at least one diagnostic apparatus connected to the cartography unit;

a display apparatus for a machine operator, the display apparatus being connected to the cartography unit; and the input unit, the machine control unit, the cartography unit, the at least one diagnostic apparatus, and the display apparatus being configured to identify process variables in a process space as operating values including at least a web tension and a web speed, carry out a measurement of actual values of the operating values, perform a step selected from the group of consisting of presetting actual values of at least one operating parameter that influences the operating values and measuring actual values of at least one operating parameter that influences the operating values, assess the operating values as a function of the at least one operating parameter, and generate a map of the process space by allocating at least a subset of points of the process space to at least two classes representing a measure of a risk of an operating state of the web-processing printing machine.

According to another feature of the invention, a navigation unit is connected to the cartography unit, the navigation unit being configured to be provided with desired values for the operating values, and to change an actual value of at least one of the operating values to a desired value of the at least one of the operating values by changing the at least one of the operating values along a given route in the process space such that points in at least one of the at least two classes are avoided.

With the objects of the invention in view there is also provided a printing machine configuration, including:

a web-processing printing machine;

an apparatus for monitoring processes in the web-processing printing machine having an input unit, a machine control unit, a cartography unit, at least one diagnostic apparatus, and a display apparatus; and the apparatus for monitoring being configured to identify process variables in a process space as operating values including at least a web tension and a web speed, carry out a measurement of actual values of the operating values, perform a step selected from the group of consisting of presetting actual values of at least one operating parameter that influences the operating values and measuring actual values of at least one operating parameter that influences the operating values, assess the operating values as a function of the at least one operating parameter, and generate a map of the process space by allocating at least a subset of points of the process space to at least two classes representing a measure of a risk of an operating state of the web-processing printing machine.

According to a further feature of the invention, the web-processing printing machine is a web-fed rotary printing machine.

According to yet a further feature of the invention, the web-processing printing machine is an offset printing machine.

Other features which are considered as characteristic for the invention are set forth in the appended claims.

Although the invention is illustrated and described herein as embodied in a method and apparatus for monitoring processes in a web-processing printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
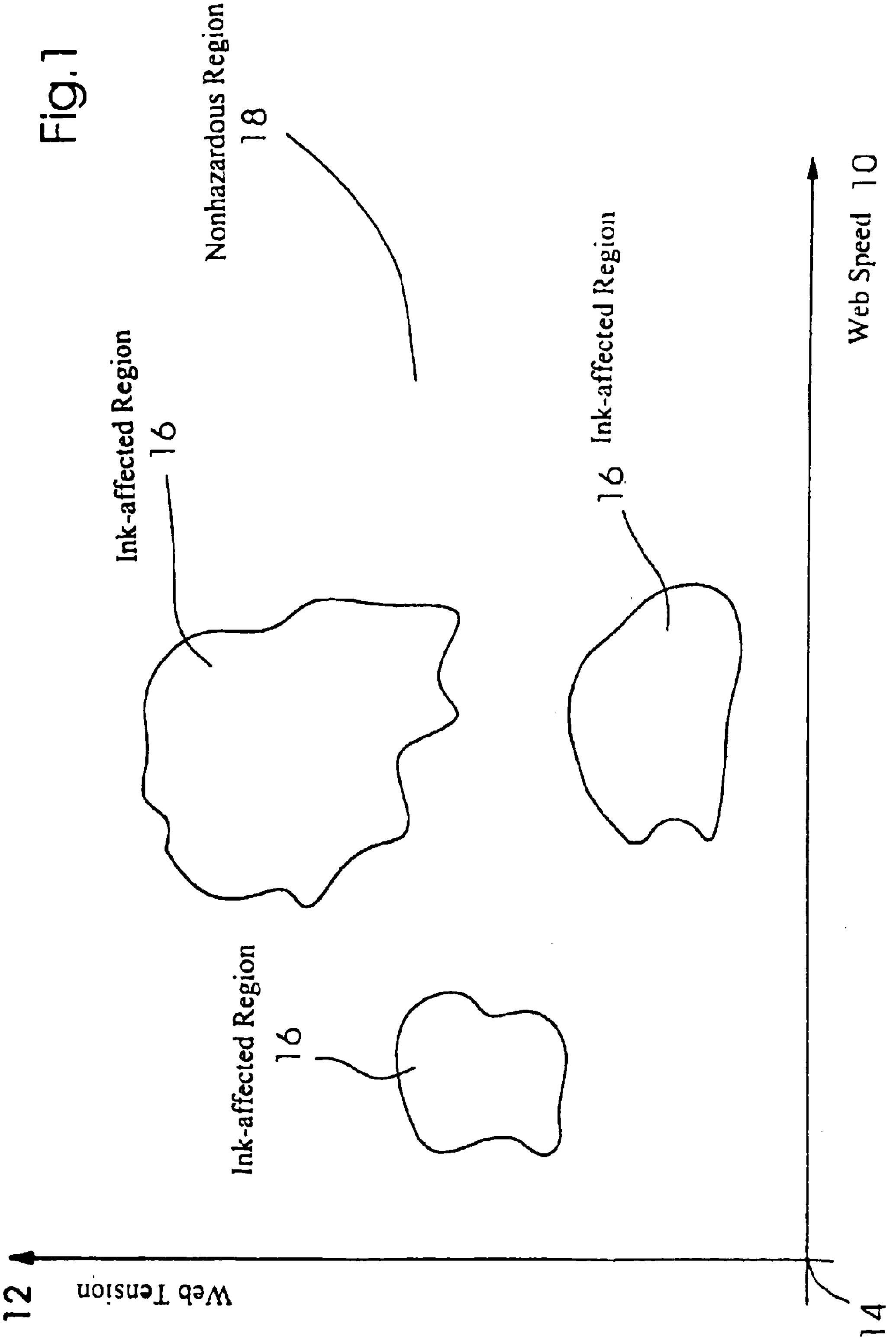
FIG. 1 is a graph for schematically representing the value of the risk classification with a subdivision including two classes as a function of the web speed and the web tension with the operating parameters of the higher-dimensioned process space being fixed.

Referring now to the figures of the drawings in detail and first, particularly, to FIG. 1 thereof, there is shown a schematic representation of the value of the risk classification with a subdivision including two classes into a function of the web speed and the web tension with operating parameters of the higher-dimensioned process space fixed. The method according to the invention for process monitoring of a printing machine for a printing material web includes the provision or the presentation of a map of the process space, in particular of the hyperplanes of the operating values as a function of the operating parameters, possible operating values, that is to say points in the hyperplane, being subjected to a classification into risk classes. FIG. 1 therefore shows the representation of a classification into a function of the operating values including web speed 10 and web tension 12, plotted in a coordinate system with origin 14. In the hyperplane covered by the operating values including web speed 10 and web tension 12, there are risk-affected regions 16 and nonhazardous regions 18. As an example, a situation is shown here in which the risk-affected regions 16 form three islands in a nonhazardous region 18. This combination is intended to serve merely for the exemplary explanation of the procedure of the map creation: the known, measured points in the hyperplane are in this example allocated either to the class "risk-affected" or "nonhazardous", represented mathematically by the numbers "1" and "0", for example. Other, not yet measured points in the hyperplane are allocated to an appropriate class membership through the use of interpolation, be it through the use of a simple analytical rule, fuzzy logic or by calculation through the use of a neural network. A simple analytical rule can, for example, be formed in that all points within an environment around a given measured point with a specific maximum distance, which is less than the minimum distance of adjacent measured points are assigned the class of measured points and in that initially points which are not covered by these environments are then assigned the class "nonhazardous".

The secured knowledge and/or the estimate of the intermediate values is then represented graphically in the form of a map, in particular is visualized in suitable form for the machine operator, be it on a monitor, display, printer or the like. A display of this type for the machine operator permits the latter to make an estimate of the risk associated with specific operating values and operating parameters through an assignment of the risk to the actual value in the process space and knowledge or an estimate of adjacent operating values and operating parameters in the process space.

Figure 2:
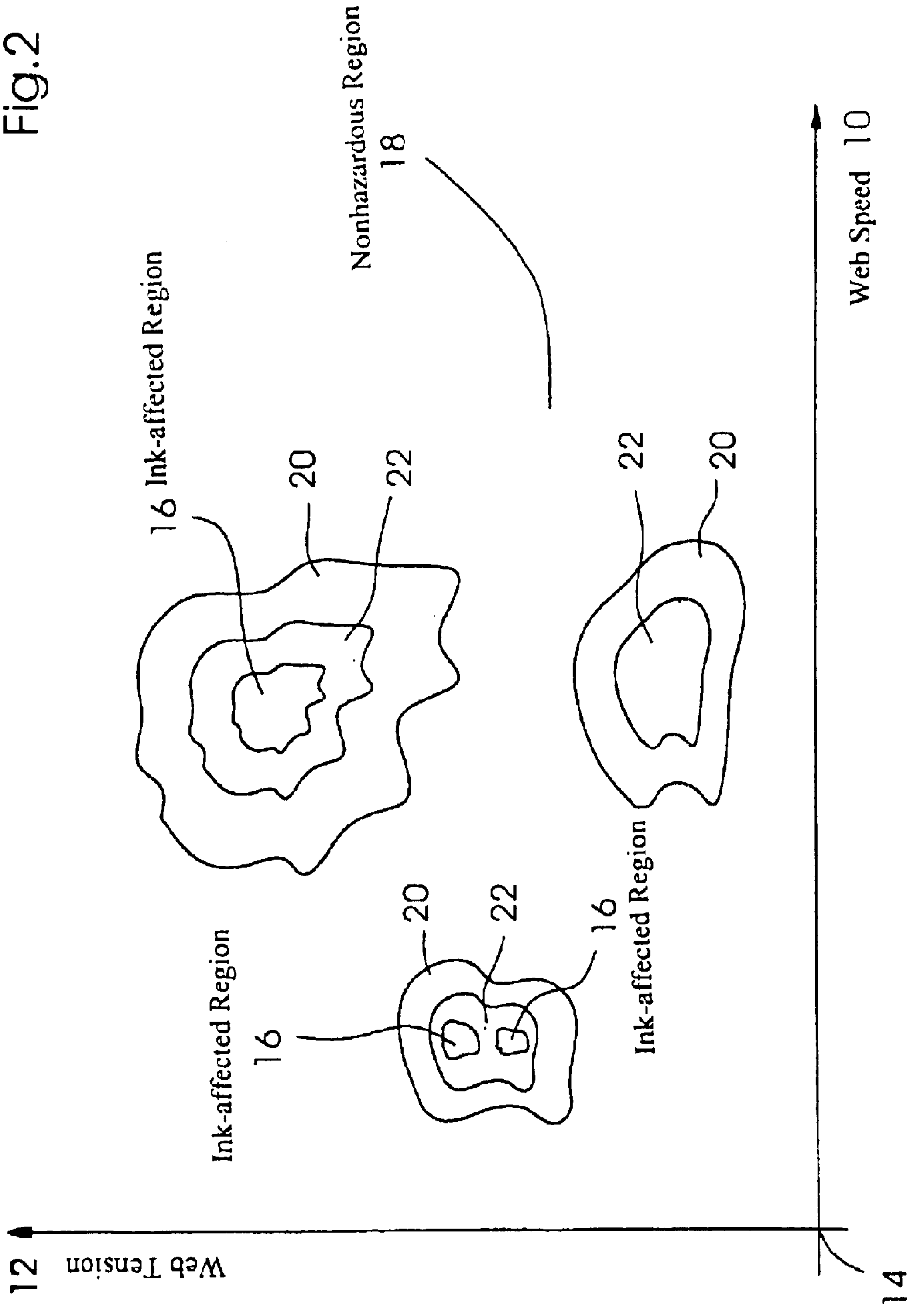
FIG. 2 is a graph for schematically representing the value of the risk classification with an alternative subdivision into a plurality of classes as a function of the web speed and the web tension with the operating parameters of the higher-dimensioned process space being fixed.

FIG. 2 shows a schematic representation of the value of the risk classification with an alternative subdivision into a plurality of classes, four here by way of example, into a function of the web speed and the web tension with operating parameters of the higher-dimensioned process space fixed. Web speed 10 and web tension 12 cover a hypersurface with origin 14. Each point on the hypersurface is allocated a membership in a class of a classification. For example, here there is a classification which includes the four classes "risk-affected", "to be avoided", "associated with a warning" and "nonhazardous". FIG. 2 shows an exemplary situation in which the hyperplane covered by web speed 10 and web tension 12 has three islands in a nonhazardous region 18, the islands having risk-affected regions 16, regions to be avoided 20 and warning regions 22. The operation of the associated printing machine for a printing material should take place in a nonhazardous region 18 of the process space. The intention is to avoid selecting or reaching operating values with associated operating parameters which lie in the region to be avoided 20, the warning region 22 or the risk-affected region 16. Through the measure of a stepped classification, that is to say three from four classes here which are not "nonhazardous", it is possible to suggest or predefine specific handling recommendations to the machine operator: for example, the region to be avoided 20 could be defined in such a way that the risk of a failure or nonproductivity of the machine is low, but nevertheless operation at such a point in the process space is not recommended. The warning region 22 can be used to impart the appropriate information of the approach to a risk-affected region 16 to the machine operator through the use of suitable visual or audible signals, so that the operator carries out appropriate handling in order to prevent or to avoid the operation of the printing machine in the risk-affected region 16.

In an advantageous development of the invention, a display of the risk classification can be carried out in an easily remembered and illustrative way by using colors for different regions on the map. For those skilled in the art, it is clear that, in addition to the two-dimensional hyperplane or hypersurface mentioned by way of example, which is covered by web speed 10 and web tension 12, further hyperplanes, hypersurfaces or three-dimensional hyper spaces can be visualized in an analogous manner. The current status, that is to say the actual value in the process space, can be displayed through the use of a suitable cursor on the map.

In this connection, it should also be pointed out that the map represented can be dynamic in the sense that the currently applicable hyperplane is always visualized. Under changing operating conditions a hyperplane corresponding to these will therefore be shown which, therefore, in the general case can also have a different pattern of regions.

Figure 3:
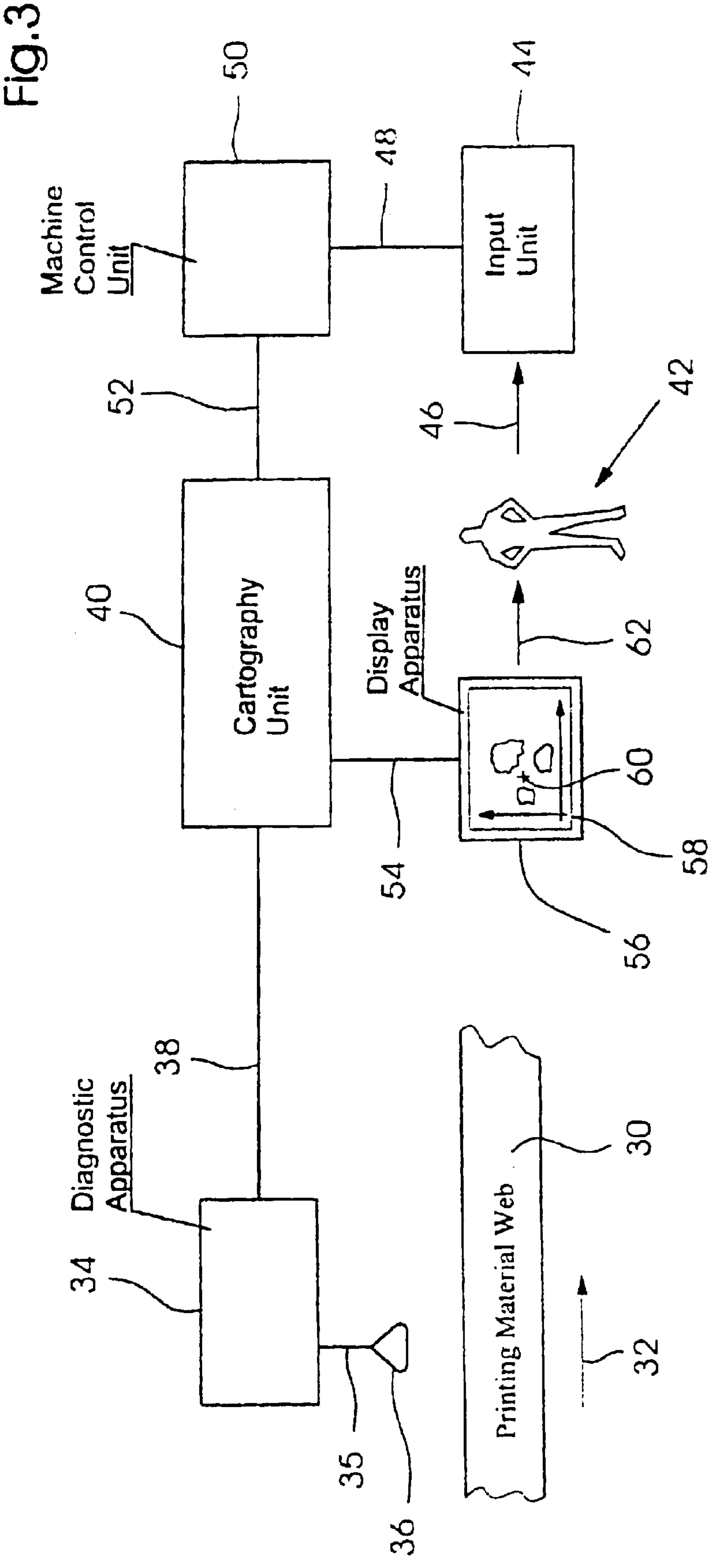
FIG. 3 is a schematic view of a topology of one embodiment of the apparatus according to the invention for implementing the process monitoring of a printing machine for a printing material web.

FIG. 3 shows a schematic representation of a topology of one embodiment of the apparatus according to the invention for implementing the process monitoring of a printing machine for a printing material web. The printing material web 30 is moved with a speed vector 32 past a measuring apparatus 36, preferably to determine the web speed and the web tension. The measuring apparatus 36 is in contact, via a data link 35, with a diagnostic apparatus 34, which obtains data from the measurement of the measuring apparatus 36. Via a first link for data transfer 38, the information about the actual values of the operating values is transmitted to a cartography unit 40. This cartography unit 40 creates a map of the risk classification as a function of the at least two operating parameters including web tension and web speed at specific operating parameters.

Provision can be made for this cartography unit 40 also to calculate intermediate values for points in the hyperplane from risk values known from measurements or acquired by ongoing measurements, a simple analytical interpolation rule or fuzzy logic with suitable rules and fuzzy sets being used. For suitable fuzzy logic, for example, four classes with associated low, medium, high and maximum probability of a web break can be determined. From specific rules, which link specific operating parameters with one another or with operating values, or include fuzzy rules for the assignment of points in the process space to specific classes following defuzzification a point in the process space can be granted membership of a specific class. Rules of this type can be obtained on the basis of expert knowledge or through the use of mathematical derivation from test results. Furthermore, the cartography unit 40 can be equipped with a neural network. In this case, the neural network learns via a large number of data sets which were combinations for a specific risk class of particular significance. Furthermore, it is in a position to weight specific operating parameters in accordance with their significance. The increasing emphasis of central relationships between the operating values and operating parameters, respectively, and the risk classes as it were represents the growing wealth of experience of the neural network, through the use of which the experience of knowledge about the printing machine or the series to which this printing machine belongs is simulated. The neural network can in this case learn both from test situations and also during real production operation of the machine.

The machine operator 42 has an input unit 44 into which an input of desired values for operating values, such as the web speed and the web tension, and/or operating parameters 46 can be made. With a second link 48 for data transfer, this information can be transferred into a machine control unit 50. The machine control unit 50 is operatively connected by a third link 52 for data transfer to the cartography unit 40 and therefore provides, for example, desired values for operating values and operating parameters for creating a map in the process space. Through the use of a fourth link for data transfer 54, the information present in the cartography unit 40 can be transmitted to a display apparatus 56, for example a monitor, a display, a printer or the like. A graphical representation 58 of the map of the process space is made available to the machine operator 42. Through the use of a cursor, in the form of a cross by way of example here, the actual value of the present operating values at present operating parameters can be visualized. The uptake of information 62 for the machine operator 42 is therefore substantially simplified and not only is the present actual state of the printing machine displayed to him, but at the same time also the associated environment in the process space. It is possible for the machine operator 42 to change the machine state through the use of the input 46 of desired values. In the process he can follow the change in the actual value 60 conveniently and efficiently in the graphical representation 58 of the map of the process space on the display apparatus 56.

The apparatus according to the invention can be configured in such a way that the hyperplane of operating values corresponding to specific, currently prevailing operating parameters is visualized. In other words, in the event of varied or changing conditions, the map displayed is not static, but instead the regions of individual classes displayed change the position of their boundaries. On the one hand, therefore, it is for the machine operator 42 to avoid the actual state of the machine coming to lie in a risk-affected region on the basis of a change of operating parameters or operating values which he induces, and on the other hand, the dynamics of the machine are visualized for him by displaying the hyperplane in the process space. The machine operator therefore sees the level of risk of a current situation, corresponding to a point in the process space and he is able to estimate the danger of entering a risk-affected zone.

To those skilled in the art, it is clear that the visualization does not need to be restricted only to the web speed and the web tension but that the method according to the invention can also be applied to further operating values.

Figure 4:
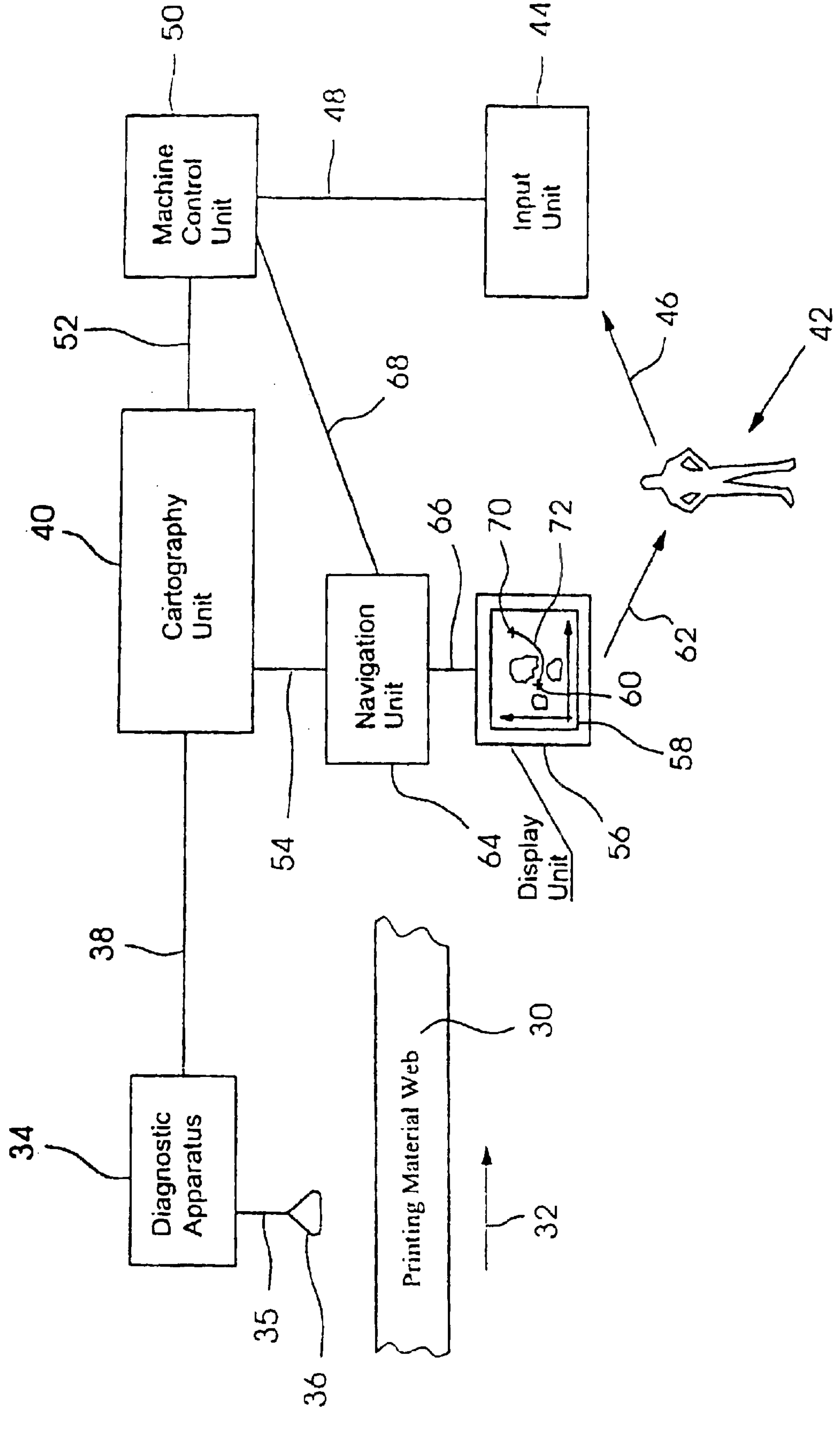
FIG. 4 is a schematic view of a topology of an advantageous embodiment of the apparatus according to the invention for implementing the process monitoring of a printing machine for a printing material web.

FIG. 4 shows a schematic representation of a topology of an advantageously developed embodiment of the apparatus according to the invention for implementing the process monitoring of a printing machine for a printing material web. For a printing material web 30 with a speed vector 32, a diagnostic apparatus 34 with a measuring apparatus 36 is provided, the two being linked by a data link 35. The diagnostic apparatus 34 generates information about actual values of specific operating values, for example of the web tension and the web speed, from the measured values obtained through the use of the measuring apparatus 36. The diagnostic apparatus 34 is in contact via a first link for data transfer 38 with a cartography unit 40. The machine operator 42 has an input device 44 for the input 46 of desired values for operating values and/or of values for operating parameters. Via a second link for data transfer 48, this information can be transmitted to a machine control unit 50. This machine control unit 50 is in contact via a third link for data transfer 52 with the cartography unit 40 and can communicate to the latter the desired values for operating values and/or values for operating parameters. Furthermore, a navigation unit 64 is provided, which has a fourth link 54 for data transfer to the cartography unit 40, a fifth link for data transfer 66 to a display apparatus 56 and a sixth link for data transfer 68 to the machine control unit 50. The display apparatus 56 permits a graphical representation 58 of the map of the process space with an actual value 60 and a desired value 70. The objective of the navigation unit 64 is automatically to determine a possibly optimized (for example shortest or quickest) path or route from the actual value 60 to the desired value 70 while avoiding regions in the hyperplane outside the nonhazardous region. The automatic navigation therefore has knowledge about the map of the process space and, through the use of a suitable mathematical method, can determine a route 72 in the process space which is to be run through through the use of varying machine parameters in the machine control unit 50. In other words: through increasing knowledge of the dynamics of the risk classes for various production conditions, it is possible to determine a specific route in the process space for a specific production, that is to say to predict a printing machine control path on the map of the process space for part or the whole of the production.

For those skilled in the art, it is clear that the coincidence of the various functional units, as shown in FIG. 3 or FIG. 4, will lead only to an equivalent embodiment but not to a changed topology of the apparatus according to the invention. From this point of view, adding direct, additional links between the units leads to an equivalent topology, since the functional relationship between the individual units is preserved.

What is claimed is:

1. A method for monitoring processes of a web-processing printing machine, the method which comprises:

identifying process variables in a process space as operating values including at least a web tension and a web speed;

measuring actual values of the operating values;

performing a step selected from the group consisting of presetting actual values of at least one operating parameter that influences the operating values and measuring actual values of at least one operating parameter that influences the operating values;

assessing the operating values in dependence on the at least one operating parameter; and generating a map of the process space by allocating at least a subset of points of the process space to at least two classes representing a measure of a risk of an operating state of the web-processing printing machine.

2. The method of monitoring processes of a web-processing printing machine according to claim 1, which comprises increasing an accuracy of the map of the process space by using information obtained from ongoing measurements and a further processing of the information.

3. The method of monitoring processes of a web-processing printing machine according to claim 1, which comprises providing the at least one operating parameter as at least one parameter selected from the group consisting of printing material characteristics, time since a last web cut, time since a last rubber blanket cleaning, parameters of a dryer, rate of printing material defects on a running reel.

4. The method of monitoring processes of a web-processing printing machine according to claim 2, wherein the step of generating the map includes at least one step selected from the group consisting of performing an interpolation of functional values and performing a class allocation between measured points in the process space.

5. The method of monitoring processes of a web-processing printing machine according to claim 2, which comprises refining the map by performing at least one step selected from the group consisting of performing an interpolation of functional values and performing a class allocation between measured points in the process space.

6. The method of monitoring processes of a web-processing printing machine according to claim 2, which comprises increasing an accuracy of the map by performing at least one step selected from the group consisting of performing a calculation of functional values and performing class allocations by using a fuzzy logic.

7. The method of monitoring processes of a web-processing printing machine according to claim 2, which comprises refining a knowledge of the map by performing at least one step selected from the group consisting of performing a calculation of functional values and performing class allocations by using a fuzzy logic.

8. The method of monitoring processes of a web-processing printing machine according to claim 2, which comprises using a neural network for further processing the information obtained by the ongoing measurements.

9. The method of monitoring processes of a web-processing printing machine according to claim 1, which comprises:

providing desired values for the operating values; and changing an actual value of at least one of the operating values to a desired value of the at least one of the operating values by changing the at least one of the operating values along a given route in the process space such that points in at least one of the at least two classes are avoided.

10. The method of monitoring processes of a web-processing printing machine according to claim 1, which comprises monitoring a printing process of the web-processing printing machine.

11. An apparatus for monitoring processes in a web-processing printing machine, comprising:

an input unit;

a machine control unit connected to said input unit;

a cartography unit connected to said machine control unit;

at least one diagnostic apparatus connected to said cartography unit;

a display apparatus for a machine operator, said display apparatus being connected to said cartography unit; and said input unit, said machine control unit, said cartography unit, said at least one diagnostic apparatus, and said display apparatus being configured to identify process variables in a process space as operating values including at least a web tension and a web speed, carry out a measurement of actual values of the operating values, perform a step selected from the group consisting of presetting actual values of at least one operating parameter that influences the operating values and measuring actual values of at least one operating parameter that influences the operating values, assess the operating values as a function of the at least one operating parameter, and generate a map of the process space by allocating at least a subset of points of the process space to at least two classes representing a measure of a risk of an operating state of the web-processing printing machine.

12. The apparatus for monitoring processes in a web-processing printing machine according to claim 11, including a navigation unit connected to said cartography unit, said navigation unit being configured to be provided with desired values for the operating values, and to change an actual value of at least one of the operating values to a desired value of the at least one of the operating values by changing the at least one of the operating values along a given route in the process space such that points in at least one of the at least two classes are avoided.

13. A printing machine configuration, comprising:

a web-processing printing machine;

a monitoring apparatus for monitoring processes in the web-processing printing machine having an input unit, a machine control unit, a cartography unit, at least one diagnostic apparatus, and a display apparatus; and said monitoring apparatus being configured to identify process variables in a process space as operating values including at least a web tension and a web speed, carry out a measurement of actual values of the operating values, perform a step selected from the group consisting of presetting actual values of at least one operating parameter that influences the operating values and measuring actual values of at least one operating parameter that influences the operating values, assess the operating values as a function of the at least one operating parameter, and generate a map of the process space by allocating at least a subset of points of the process space to at least two classes representing a measure of a risk of an operating state of the web-processing printing machine.

14. The printing machine configuration according to claim 13, wherein said web-processing printing machine is a web-fed rotary printing machine.

15. The printing machine configuration according to claim 13, wherein said web-processing printing machine is an offset printing machine.

* * * * *